Nov. 13, 1934.  H. BATES  1,980,249
PROPELLER
Filed April 23, 1931
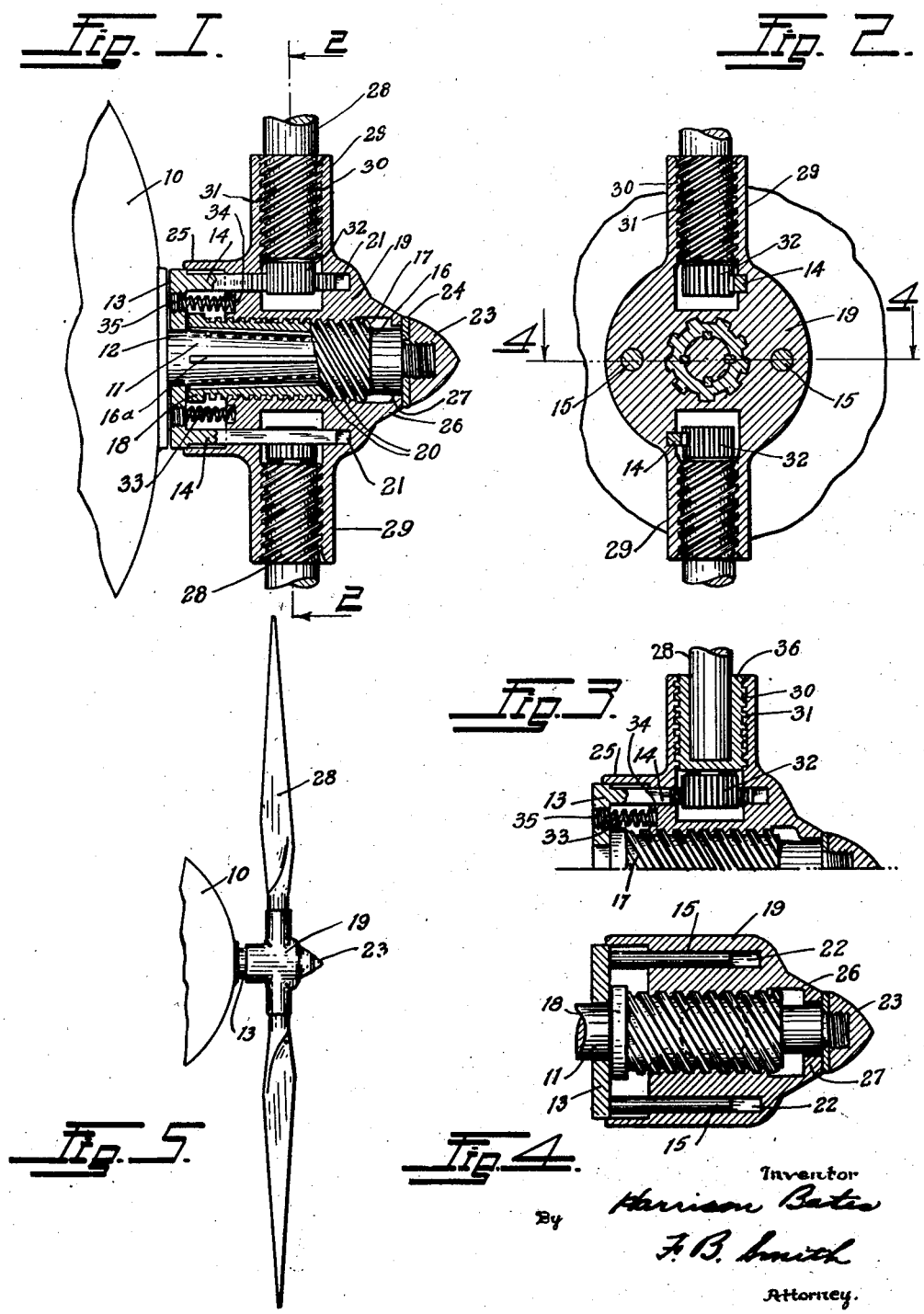
Inventor
Harrison Bates
By F. B. Smith
Attorney.

Patented Nov. 13, 1934

1,980,249

UNITED STATES PATENT OFFICE 1,980,249

PROPELLER

Harrison Bates, Greenville, S. C., assignor to Bendix Research Corporation, East Orange, N. J., a corporation of Indiana Application April 23, 1931, Serial No. 532,326

13 Claims. (Cl. 170—162)

This invention relates to the variable pitch propellers for use with aircraft and more particularly to variable pitch propellers of the automatic type.

Due to the varied atmospheric conditions under which aircraft must operate, it has been found desirable to provide propellers having means for varying the pitch of the propeller blades during operation in order to increase the operating efficiency, also in order to reduce the external load on the aircraft engine when a higher speed of the aircraft engine is desired in order to obtain the maximum power output as in taking off, climbing, or other conditions where instant maximum power is desired.

It is of great importance that the external load on the engine be instantly reduced and varied in accordance with the engine speed in order to obtain the maximum efficiency from the engine power and to reduce the propeller slip to a minimum.

Many types of variable pitch propellers have been proposed, such as manually operated, barometrically thrust, or otherwise automatically operated. All of such types of propellers fall short of providing the efficiency required for economical operation. This is due, for the most part, to the lack of synchronism and harmony between the engine and the means for varying the pitch of the propeller blades. In the case of the manually operated means, it is obvious that the operating efficiency is limited to the guesswork of the pilot, and is further undesirable, due to the added bulk and weight necessary to provide such a structure.

In the case of the barometrically operated means the operation of such means is limited to the changes of atmosphere and lends no hand whatever in reducing the external load on the engine during taking off, climbing, or the like. This type is also undesirable due to the added bulk and weight required to provide an operable structure.

Other automatic means that have been proposed for varying the pitch of propeller blades present many difficulties. For the most part this is due to such means not being synchronized with, or directly responsive, to the engine power.

It has been proposed to vary the pitch of propeller blades by longitudinal movement of the propeller hub along the propeller shaft against yielding means and adapted to fluctuate in response to the propeller thrust. Such a structure is sluggish in operation due to the resistance set up by the shearing forces on the splines or bearings between the propeller hub and shaft during movement of the hub along the shaft. Such a mechanism is inherently sluggish due to the lack of sensitiveness of the propeller hub in responding to the propeller thrust for movement of the hub along the shaft even when the changes in the propeller thrust occur at relatively high speeds.

It is one object of this invention to provide in a propeller novel means for automatically varying the pitch of propeller blades that shall overcome the above difficulties.

Another object is to provide in a propeller novel means for automatically varying the pitch of propeller blades in response to the driving torque of the propeller shaft.

Another object is to provide novel automatic means for varying the pitch of propeller blades that shall instantly reduce the pitch of the propeller blades when the driving torque of the propeller shaft is increased and instantly increasing the pitch of the said blades when the driving torque of the propeller shaft is decreased.

A further object is to provide a novel automatic variable pitch propeller wherein the force produced in the several parts during the operation thereof cooperate one with the other in such a manner as to vary the pitch of the propeller blades to effect a constant propeller thrust at a given R. P. M.

A still further object is to provide a variable pitch propeller having the above characteristics and means for utilizing the centrifugal and torque forces for maintaining a constant propeller thrust at a given R. P. M.

The above and other objects will be apparent thruout the further description of the invention when taken in connection with the accompanying drawing wherein like reference characters refer to like parts.

In the drawing—

Fig. 1 is an enlarged axial view taken thru the propeller hub embodying one form of the invention.

Fig. 2 is a sectional view taken along the line 2—2 of Fig. 1.

Fig. 3 is a partial sectional view embodying another form of the invention.

Fig. 4 is a sectional view taken along the line 4—4 of Fig. 2.

Fig. 5 is an elevation view of a propeller embodying the invention.

In the form shown, a propeller hub is mounted on the shaft by means of the spiral track and adapted for relative oscillatory and longitudinal movement with respect to the shaft. Propeller blades are mounted within bosses on the propeller hub by means of a spiral track which permits turnable movement of the blades within the bosses and radial movement of the blades with respect to their hub and means intermediate the hub mounting and the blade mountings for balancing the centrifugal forces developed by the blades as against the torque forces of the propeller shaft.

In the forms shown in Figs. 1, 2, 4 and 5, illustrate one embodiment in which 10 indicates a motor housing having a conventional propeller shaft 11 protruding therefrom, the latter being provided with a bearing surface 12 for rotatably supporting a disc or frame member 13, the latter being provided with diametrically oppositely disposed racks 14, spaced apart and in parallel relation with the longitudinal axis of the propeller shaft.

The member 13 is also provided with guides or driving members 15 disposed in spaced and parallel relation with the rack members 14 and in a plane substantially at right angles to the plane of the rack members.

The shaft 11 is further provided with an annular member 16 rigidly splined thereon, having external spiral tracks 17 and a flange 18 at its inner end adapted to prevent outward movement of the disc 13. A hub 19 is mounted on the member 16 and adapted for relatively longitudinal and rotary movement thereof by means of a longitudinal opening thru the hub 19, said opening being provided with internal spiral tracks 20 adapted to receive and cooperate with the spiral tracks 17 provided on the member 16. The hub is further provided with longitudinal openings 21 and 22 for receiving and cooperating with the rack members 14 and guide members 15 respectively.

Suitable hub retaining means 23 is provided for the well-known purpose and in the present instance also serves to prevent outward movement of the member 16, the latter being rigidly splined on the shaft 11 by means of splines 16a and may be considered an integral part of the shaft 11 but is here provided in order that the present device may be adapted for use with the conventional propeller shaft. For the sake of simplicity the conventional propeller shaft 11 and the external track member 16 will hereinafter be referred to as the propeller shaft.

A suitable bearing surface 24 is provided between the front end of the hub and the retaining means 23 and serves to limit the outward movement of the hub with respect to the propeller shaft.

The flange 18 may be of such thickness as to serve as a stop for the inward movement of the hub on the propeller shaft. However, suitable stop members not shown for predetermining the inward movement of the hub may be provided on the outer face of the frame member 13.

The hub is also provided with an annular apron or cover 25 extending rearwardly of its inner end for receiving the disc of frame member 13 as the hub moves inwardly along the propeller shaft.

The front end of the hub is also provided with an apron or cover 26 having an annular extending flange 27 adapted to engage the member 24, the internal diameter of the flange 27 being substantially the same as the external diameter of the hub which it encircles. The aprons or covers 25 and 26 are preferably formed as an integral part of the hub as shown. Further, it is to be understood that the aprons may be formed separately from the hub.

Propeller blades 28 are mounted in radially extending hollow bosses 29 provided on the hub by means of external spiral tracks 31 provided adjacent to the inner end of the blades and adapted to engage corresponding internal spiral tracks 30 within the bosses 29.

On the inner ends of the blades are provided pinions 32 rigidly fixed thereto and positioned to mesh with their corresponding rack members 14, the pinions being greater in length than the width of the racks for permitting lateral movement thereon.

Yielding means 33 which may consist of a plurality of springs are interposed between the outer face of member 13 and the inner face of the hub 19 for urging the hub to its normal outermost position on the shaft, the yielding means 33 are held in place by openings or wells 34 provided in the inner face of the hub and a threaded means 35 provided in the disc 13. The threaded means 35 are also adapted to selectively adjust the tension of the yielding means 33.

The several forces operate as follows:

The centrifugal force of the blades, minus the blade torque or twist, plus the yielding means, tend to increase the pitch of the blades. The driving torque of the propeller shaft tends to decrease the pitch of the propeller blades. The amount of the centrifugal force effective on the pinion and racks may be increased or decreased by increasing or decreasing the pitch of the spiral tracks associated with the blades while the amount of driving torque of the propeller shaft effective on the pinion and racks may be increased or decreased by increasing or decreasing respectively the pitch of the spiral track associated with the propeller shaft.

Fig. 3 shows a slightly different embodiment of the invention to the extent of the member 36 which is provided for receiving the blade 28 whereby standard blades may be used with the hub.

The operation of the device is as follows:

Upon applying the throttle, and considering that the propeller is rotated counterclockwise, as viewed from the front, Fig. 1, the driving torque of the propeller shaft instantly reduces pitch to a minimum, and as the speed of the propeller is increased, developing centrifugal force, the pitch will be automatically increased. Also at high altitudes, due to the rarefication of the air, the amount of driving torque to drive the propeller at a given number of revolutions will be decreased, while the centrifugal force of the blades at the same altitude will remain constant and cause the blade pitch to be increased.

Further, when a constant driving torque of the shaft causes the motor to revolve faster at high altitudes, due to the rarefication of the air, decreasing the external load on the motor, such increased revolutions will increase the centrifugal force of the blades and automatically provide a greater pitch, the latter operating to increase the external load on the motor and thereby maintaining the revolutions of the motor substantially constant at a good torque of the propeller shaft.

Many important features are provided by the present simple and rugged structure, such as its compactness, few parts, its instant reaction to the torque and centrifugal forces during high driving torque of the propeller shaft, the inherent sensitiveness of the various parts to respond to the action of the cooperating forces, the spiral tracks which permit movement of the hub and blade mountings with comparatively no resistance, and the comparatively small added weight necessary to produce a superior and greatly needed commercial product.

While the invention is described in connection with an aircraft propeller, it is obvious that the same may be employed with any other type of propeller, and while only two embodiments of the invention have been illustrated and described it will be apparent to those skilled in the art that other changes, modifications, substitutions, additions and omissions may be made without departing from the spirit or scope of the invention as defined by the appended claims.

What is claimed is:

1. In a variable pitch propeller having a hub and a blade, means for rotating said hub, means for mounting said hub on said rotating means for relative movement therebetween, means for mounting said blade in said hub for radial movement thereof, and means responsive to relative movement of the hub with respect to the first-named means and radial movement of said blade with respect to said hub for automatically varying the pitch of said blade during rotation of the hub.

2. In combination with a propeller shaft, of a hub having a blade, means for mounting said hub on said shaft for relative movement therebetween, means for mounting said blade in said hub for radial movement thereof, means responsive to radial movement of said blade with respect to said hub for varying the pitch of the blade, and means responsive to longitudinal movement of said hub along said shaft for effecting said radial movement of the blade.

3. In combination with a propeller shaft, of a rotatable hub having a blade, means for mounting said hub on said shaft for relative rotary movement therebetween, means for mounting said blade in said hub for radial movement thereof, and means responsive to relative rotary movement of said hub and radial movement of said blade with respect to said shaft for automatically varying the pitch of said blade.

4. A variable pitch propeller having a plurality of blades, means for driving said blades, and means responsive to the outward thrust due to centrifugal force on said blades and to the torque of said driving means for varying the pitch of the blades.

5. A variable pitch propeller having a hub, a plurality of blades carried by said hub, means for driving said hub, means for mounting said hub on the driving means for relative rotary and longitudinal movement thereof, said movement of the hub being means dependent upon the torque of said driving means and the centrifugal force of said blades for so moving the hub, and means effective during such movement for varying the pitch of the blades.

6. An aircraft propeller having a plurality of blades, means for rotating said blades, means responsive to the driving torque of said rotating means tending to decrease the pitch of said blades, and means responsive to the radial thrust of the blades due to centrifugal force tending to increase the pitch of the blades.

7. In combination, a rotatable shaft, a plurality of propeller blades adapted to be rotated by said shaft, means responsive to the driving torque of said shaft for decreasing the pitch of said blades, yieldable means cooperating with said torque-responsive means, and means responsive to centrifugal force tending to increase the pitch of said blades.

8. A propeller comprising a plurality of pitch-variable blades, a hub therefor, means for rotating said hub, resilient means for normally maintaining the pitch of said blades at a maximum, a helical driving connection between the hub and rotating means whereby said hub is relatively angularly movable with respect to said rotating means in response to the torque of the latter to reduce the pitch, and means responsive to the centrifugal force of the blades tending to increase the pitch.

9. In a propeller having a hub, a plurality of blades, a drive shaft for said hub, means including a helical driving connection between said shaft and hub for moving the latter with respect to the shaft in accordance with the radial thrust of the blades due to centrifugal force thereon, and means operable during movement of the hub for varying the pitch of the blades.

10. A propeller comprising a rotatable shaft, a hub, blades carried by the hub, means for drivably connecting said hub and shaft, said hub being movable axially of said shaft in response to the torque of said shaft and the centrifugal force of the blades, and means including gearing for rotating said blades about their longitudinal axes with respect to said hub, said last-named means being operable during axial movement of the hub.

11. In combination, a hub, a plurality of propeller blades rotatably mounted in said hub, an engine-driven shaft for rotating the hub, means responsive to the torque of said shaft for moving said hub in one direction with respect to the shaft, means responsive to centrifugal force for moving said hub in another direction with respect to the shaft, and means operable during movement of the hub in either direction to vary the pitch of the blades.

12. A propeller comprising a plurality of pitch variable blades, a hub therefor, means for rotating said hub, resilient means for normally maintaining the pitch of said blades at a maximum, a helical driving connection between the hub and rotating means whereby said hub is relatively angularly movable with respect to said rotating means in response to the torque of the latter to reduce the pitch, and a helical mounting in said hub for receiving each of said blades whereby the latter move outwardly with respect to the hub in response to the centrifugal force of the blades to increase their pitch.

13. A variable pitch propeller having a rotatable shaft, a hub drivably connected with said shaft, a blade rotatably mounted in the hub, and means including connections between said blade and shaft for varying the pitch of said blade in accordance with a balance between the torque of said shaft and the radial thrust of said blade due to centrifugal force thereon.

HARRISON BATES.